(12) United States Patent
Kipnes et al.

(10) Patent No.: US 7,493,560 B1
(45) Date of Patent: Feb. 17, 2009

(54) DEFINITION LINKS IN ONLINE DOCUMENTATION

(75) Inventors: Ken Kipnes, Litchfield, NH (US); Donald Elliott Raikes, Tucson, AZ (US); Edna C. Elle, Bow, NH (US)

(73) Assignee: Oracle International Corporation, Redwood Shores, CA (US)

( * ) Notice: Subject to any disclaimer, the term of this patent is extended or adjusted under 35 U.S.C. 154(b) by 771 days.

(21) Appl. No.: 10/278,330

(22) Filed: Oct. 22, 2002

Related U.S. Application Data

(60) Provisional application No. 60/382,360, filed on May 20, 2002.

(51) Int. Cl.
*G06F 3/00* (2006.01)
(52) U.S. Cl. .................. 715/729; 715/205; 715/708; 715/727; 715/764; 715/808
(58) Field of Classification Search ............. 715/501.1, 715/708, 727, 729, 764, 808
See application file for complete search history.

(56) References Cited

U.S. PATENT DOCUMENTS

| | | | | |
|---|---|---|---|---|
| 5,461,399 A * | 10/1995 | Cragun | ....................... | 715/729 |
| 5,708,825 A * | 1/1998 | Sotomayor | ................ | 715/501.1 |
| 5,870,767 A * | 2/1999 | Kraft, IV | .................. | 715/501.1 |
| 5,987,482 A * | 11/1999 | Bates et al. | ................. | 715/513 |
| 6,085,161 A * | 7/2000 | MacKenty et al. | .......... | 704/270 |
| 6,128,635 A * | 10/2000 | Ikeno | ....................... | 715/532 |
| 6,154,757 A * | 11/2000 | Krause et al. | ............... | 715/530 |
| 6,199,071 B1 * | 3/2001 | Nielsen | ....................... | 707/204 |
| 6,762,777 B2 * | 7/2004 | Carroll | ....................... | 715/808 |
| 6,772,139 B1 * | 8/2004 | Smith, III | ..................... | 707/3 |
| 6,934,907 B2 * | 8/2005 | Brunet et al. | ............. | 715/501.1 |
| 7,107,517 B1 * | 9/2006 | Suzuki et al. | ............. | 715/501.1 |
| 2002/0003547 A1 * | 1/2002 | Wang et al. | ................. | 345/727 |
| 2002/0069223 A1 * | 6/2002 | Goodisman et al. | ......... | 707/513 |
| 2002/0122053 A1 * | 9/2002 | Dutta et al. | ................. | 345/729 |
| 2002/0152238 A1 * | 10/2002 | Hayes | ........................ | 707/513 |
| 2003/0164848 A1 * | 9/2003 | Dutta et al. | .................. | 345/729 |

OTHER PUBLICATIONS

IBM Technical Disclosure Bulletin, Hyperfootnote, Jun. 1, 2001, Issue 446, p. 1014.*
CodeAve.com, New Window (Pop-Up Window), Close Window, Apr. 5, 2001, http://web.archive.org/web/20010405064606/http://codeave.com/javascript/code.asp?u_log=7038, http://web.archive.org/web/20010405064606/http://codeave.com/javascript/code.asp?u_log =7014.*
Window-Eyes 4.0 User's Guide, Mar. 4, 2001, GW Micro Inc., Table of Contents, Section 4, Appendix F, http://web.archive.org/web/20010304160117/www.gwmicro.com/wemanual/appendix-f.html.*
Window-Eyes 4.0 User's Guide, Mar. 3, 2001, GW Micro Inc., Section 5.5: Verbosity Settings, Section 6.6: The Rest of the Screen Menu, Section 8.3: Reading Characters, Words, Lines, Sentences, and Paragraphs, Section 12.8: The Status of the User Windows, http://web.archive.org/web/20010303180735/http://www.gwmicro.com/wemanual/index.html.*

* cited by examiner

*Primary Examiner*—Tadesse Hailu
*Assistant Examiner*—Alvin H Tan
(74) *Attorney, Agent, or Firm*—Hickman Palermo Truong & Becker LLP

(57) ABSTRACT

A method and apparatus for definition links for online documentation is provided. According to one aspect of the invention, the definition links for online documentation provide a non-sighted or visually impaired user employing a screen reading utility a method to select a definition link from an online document which in turn navigates the user to a corresponding link definition area of the online document. Once the user has finished reading the definition, the user can easily be navigated back to the original text area of the document. In one embodiment, the definition links for online documentation provides footnote information. In one embodiment, a method of accessing footnote links and corresponding footnote definitions is provided. The embodiments contained herein for definition links for online documentation adhere to United States Federal Section 508 guidelines for accessibility standards.

8 Claims, 16 Drawing Sheets

1.1.3 Cross-Reference to the Previous Footnotes

This paragraph has a cross-reference to the second footnote end of the sentence. Footnote 2 is a JavaScript popup window. The term "footref" indicates that the footnote definition appeared at least once before in this chapter. Footref 2

This paragraph has a cross-reference to the first footnote at the end of the sentence. Footnote 1 is a JavaScript popup window. Footref1

Footnote 2:
Select the CLOSE button to remove the Popup Window.

[ CLOSE ]

Footnote 1:
This is the text of the first footnote, with a link label of footref1. The footnote is placed in a popup window. When you select the CLOSE button, you will be placed back at the beginning of the section you were reading.

[ CLOSE ]

*FIG. 1*

```
1   <SCRIPT Language=JavaScript>
2   <!--JavaScript Follows
3   function footdisplay (footnum,footnote) {
4   msg=open("","NewWindow","toolbar=no,location=no,directories
    =no,status=no,menu
5   bar=no,scrollbars=no, resizable=yes,copyhistory=no,width=280,height=180");
6   msg.document.write("<CENTER><H2><B>Footnote " + footnum +
7   ":</B></H2></CENTER>");
8   msg.document.clear();
9   msg.window.focus();
10  msg.document.write(footnote);
11  msg.document.write("<CENTER><form action=\"\"method=\"post\">");
12  msg.document.write("<INPUT type=\"button\"Value=\"OK\"");
13  msg.document.write("ONCLICK='window.close()");
14  msg.document.write("</form></CENTER>");}
15  //JavaScript Ends-->
16  </SCRIPT>
17
18  An example HTML call to the JavaScript subroutine and link back to the current
19  reading area is as follows:
20
```

*FIG. 5A*

```
21  <SCRIPT Language=JavaScript>
22  <!--JavaScript Follows
23  foot2 = "<P>Normal text. <br><b>Bolded</b>text. <br>Text in <i>italics</i>. <br>
24  |"quoted|"<br> Send mail to <a
25  href=mailto:ken.kipnes@oracle.com>ken kipnes</a><br> Select the <b>OK</b>
26  button to remove the window.</P>";
27  //JavaScript Ends-->
28  </SCRIPT>
29
30  <A href='"#1003086" onclick='footdisplay(2,foot2)'><sup><font size=3>Foot
31  2</font></sup></A>
```

*FIG. 5B*

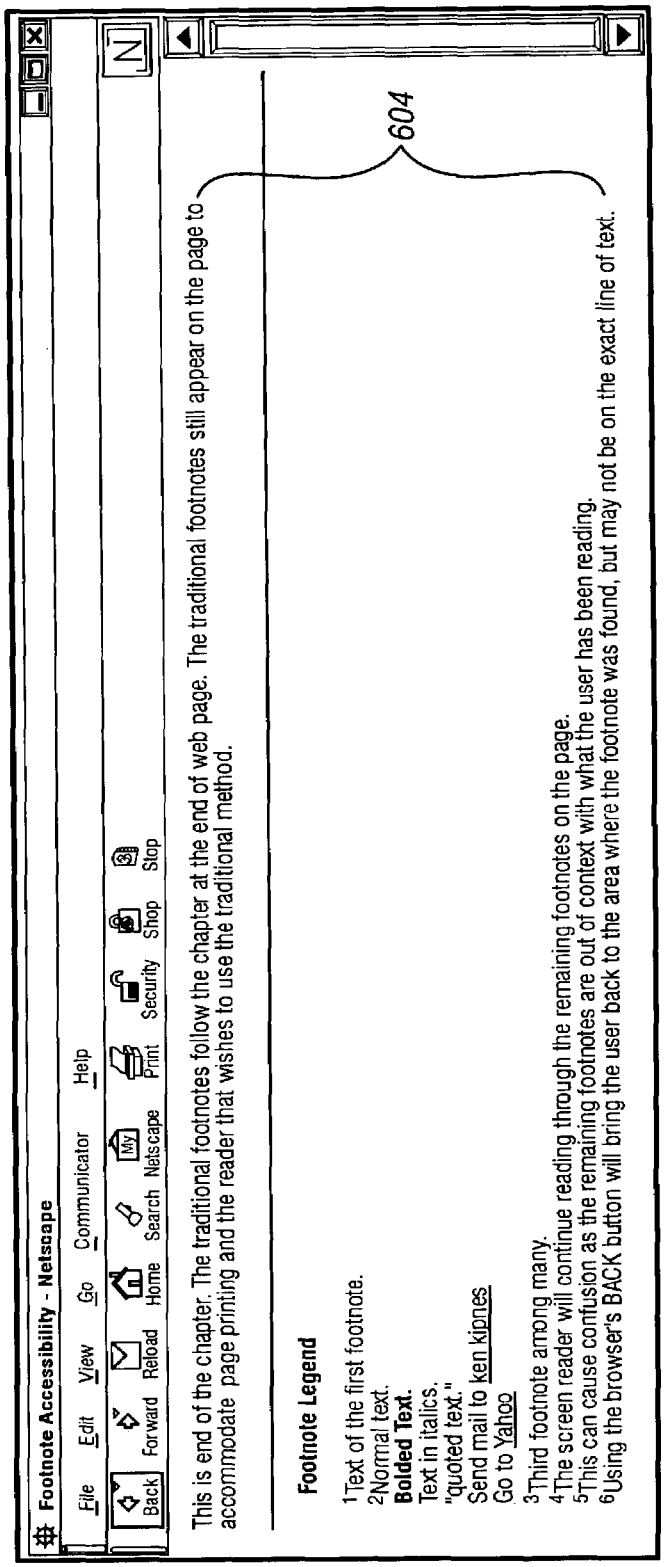
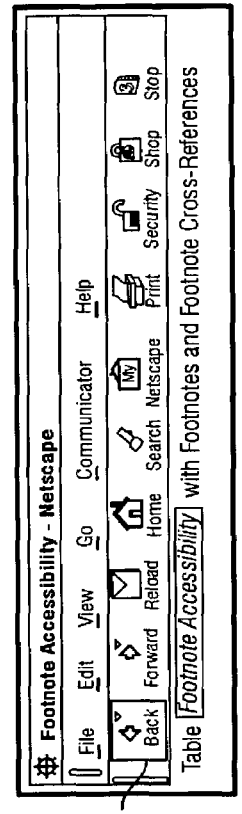
FIG. 6B

DEFINITION LINKS IN ONLINE DOCUMENTATION

CLAIM OF PRIORITY

This application claims benefit of Provisional Application Ser. No. 60/382,360, filed May 20, 2002, entitled "FOOTNOTES IN ONLINE ORACLE REFERENCE MANUALS," by Ken Kipnes, Donald Elliott Raikes and Edna C. Elle, the entire content of which is incorporated by reference for all purposes as if fully set forth herein.

FIELD OF THE INVENTION

The present invention relates generally to computer software, and more specifically to a computerized utility for definition links in online documentation.

BACKGROUND OF THE INVENTION

The mechanisms described in this section are approaches that could be pursued, but not necessarily approaches that have been previously conceived or pursued. Therefore, unless otherwise indicated, the approaches described in this section are not prior art to the claims in this application and are not admitted to be prior art by inclusion in this section.

Online documents often include text that requires further explanation, for example further definition or information outside of the current context area. In general, online documents written in online formats, for example, the hypertext markup language (HTML), use reference links, for example, hypertext reference links (HREFs) to bring the reader to another section of the document that contains definitions or further information outside of the current context.

Under Federal Section 508 of the Rehabilitation Act of 1998(29 USC '794d), Federal Agencies' electronic and information technology is required to be accessible to people with disabilities. Section 508 establishes requirements for any electronic and information technology developed, maintained, procured, or used by the Federal government. Therefore, any entity that sells or develops electronic and information technology for United States Government agencies must adhere to Federal Section 508 guidelines.

Accessibility utilities are applications that can interact with assistive technologies, such as screen readers, speech recognition systems, and refreshable braille displays. An example of an accessibility utility is a product offered by Henter-Joyce called JAWS® (Job Access With Speech). JAWS®, uses an integrated voice synthesizer and a computer's sound card to produce an audio output of the content of a computer screen. JAWS® also outputs to refreshable Braille displays. JAWS® is an example of accessibility utility technology which provides access to a wide variety of information, education, and job related applications for non-sighted or visually impaired users.

However, the limitations of conventional techniques for accessing online document definition links and their corresponding definitions present non-sighted or visually impaired users with several problems. For example, traditional, accessibility utilities such as JAWS®, read documents from top to bottom. When an accessibility utility, such as a screen reader is employed in order to read an online document, an non-sighted or visually impaired user must eventually recognize that the desired definition has finished, and the user must proactively stop the screen reader from reading further. For example, consider footnote definition links and corresponding footnote definitions in online documents. When a screen reader reads a document from top to bottom, a drawback to traditional online definition links is that when read from top to bottom, definition links and their corresponding definition areas have little meaning. The reason for this is that as these links and definition areas are out of context with each other and the associated text. For example, when a user employs a screen reader to read an online document with footnotes, once the user selects the footnote link, the user is typically navigated to the end of the page where the footnote definition resides. The user must then recognize when a definition has finished and proactively stop the screen reader from reading further. Particularly in the case where there are multiple footnotes and therefore multiple corresponding footnote definitions in an online document, once the screen reader has completed reading a footnote definition, the screen reader typically will continue on in the document reading the next, unrelated footnote definition. Thus, in conventional systems the user is required to recognize that the screen reader has finished reading the document and unrelated information, and must proactively stop the screen reader from reading further. This limitation presents an inconvenient reading experience for those in the non-sighted or visually impaired community who employ screen readers to read online documents.

Additionally, after reading information in the definition area, in order to return to the original position within the online document, conventional methods require the visually impaired user to utilize a technique, such as selecting the browser's BACK button, to bring the user back to the general area of the document. For example, when a user employs a screen reader such as JAWS® to read an online document, the user is required to stop the reader and to use the browser's BACK button to return to the main text after the definition has been read.

A drawback to this type of manual navigation back to the original area in the document is that it is a cumbersome process for the visually impaired user who employs a screen reader for reading online documents. Once the user has employed a technique such as the browser's BACK button, the non-sighted or visually impaired user is presented with only a general area of the document and must thus manually navigate the original area of the document. Typically, employing a navigation method such as selection of the browser's BACK button will bring the user to the general area of the online document, up to a full page previous to the desired area. For example, when a non-sighted or visually impaired user selects a footnote hypertext link, the user is typically navigated to the end of the page where the footnote definition area resides. Conventionally, when a user employs a screen reader to read an online document, the user must recognize when the desired footnote has finished, and stop the screen reader from reading the next unrelated footnote. Additionally, once the user has stopped the screen reader the user must then navigate back to continue reading from the original location in the document.

Another techniques for accessing online definition links require the user to place a mouse over the corresponding definition link in order to view the definition area. For example, in certain systems, placing a MouseOver a footnote definition link, a corresponding footnote definition area is displayed to the user in response to a MouseOver. However, a drawback to this technique is that utilizing a mouse is not compatible with accessibility utilities such as screen readers, therefore the user who employs the screen reader is unable to access the definition area using a mouse over. This limitation presents an inconvenient reading experience for those in the visually impaired community who employ screen readers to read online documents.

Another drawback to traditional online definition links is that the definition areas typically do not have the capability of supporting text emphasis and navigation to additional reference links within an associated definition area. Typically, when accessing conventional online definition links, the user is navigated to a separate definition area, which may contain text emphasis, and additional reference information that may be accessed through an additional reference link. For example, if a user employs a screen reader to access a footnote definition link; the associated definition area may contain text emphasis and reference to additional reference information.

Yet another drawback to traditional online definition links is that current commercially available HTML generation tools used for online documentation footnote definition links typically place an HTML NAME tag at the beginning of footnote text, rather than before the footnote number. Typically, screen readers read the corresponding footnote text without having prefaced it with the footnote number, and then read the number for the next footnote. This presents another problem for users who employ screen readers in that this limitation results in confusion for the user.

The limitations of conventional online definition links make reading online documents with definition links and corresponding definition areas problematic for users. Based upon the foregoing, it is desirable to provide a mechanism that overcomes the limitations of traditional access to online documentation definition links and their corresponding definition areas when employing an assistive technology, such as screen readers.

SUMMARY OF THE INVENTION

Techniques are provided for Definition Links for Online Documentation.

In one embodiment, a utility is provided for definition links in online documentation which support accessibility utilities. For example, definition link and corresponding definition area in online documentation support for online documents which are read utilizing assistive technology screen readers such as JAWS®.

In certain embodiments, the definition links for online documentation utility provides accessibility support for footnotes in online documentation. For example, footnote link and corresponding footnote definition support in online documents which are read utilizing assistive technology screen readers such as JAWS®.

Techniques are provided for accessing definition links in online documentation. According to other aspects, the invention encompasses a computer-readable medium, a carrier wave, an apparatus, and a system configured to carry out the foregoing functions.

BRIEF DESCRIPTION OF THE DRAWINGS

The definition links for online documentation utility of the present invention will now be illustrated by way of example, and not by way of limitation, in the figures of the accompanying drawings in which like reference numerals refer to similar elements and in which:

FIG. 1 is a block diagram of an embodiment illustrating an example of the various components in an online definition link utility;

FIGS. 5A and 5B are block diagrams of an embodiment illustrating an example of the JavaScript subroutine for an online definition link utility;

FIG. 6A thru FIG. 10B are examples of an online document illustrating an embodiment of the present invention which illustrate the difference in behavior between traditional definition links footnote and the footnote link definition utility of the present invention;

DETAILED DESCRIPTION OF THE PREFERRED EMBODIMENT

Figure 2:
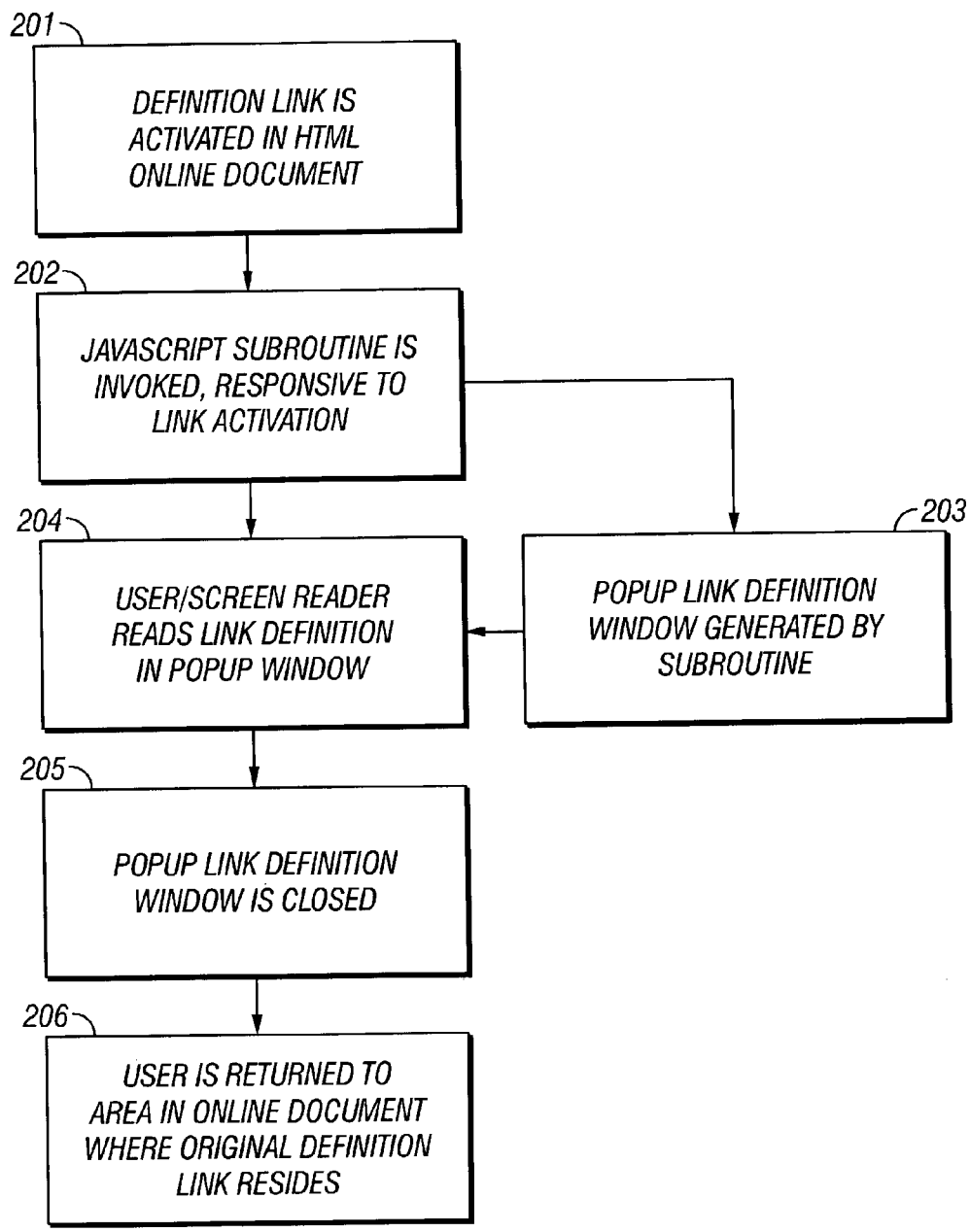
FIG. 2 is a block diagram of an embodiment illustrating a flow chart of the process of user interaction with the online definition link utility.

A method and apparatus for definition links in online documentation is described. In the following description, for the purposes of explanation, numerous specific details are set forth in order to provide a thorough understanding of the present invention. It will be apparent, however, to one skilled in the art that the present invention may be practiced without the specific details. In other instances, structures and devices are shown in block diagram form in order to avoid unnecessarily obscuring the present invention.

Functional Overview

Online technical documents generally follow a standard publishing format. In traditional online technical documents, text that requires further explanation and references to previous definitions or information outside of the current context are associated with links that take the user to another area of the document that contain the corresponding definition text. For example, footnote definition links have a numeric superscript that is placed after the text in question and the reference information is placed at the end of the page or chapter. In the case of a table, reference information is generally placed at the end of the table. The link, which is indicated by the numeric superscript, is defined in HTML as an HREF so that the user may select the link and be brought directly to definition text or reference information using the HTML NAME tag.

According to certain embodiments of the invention, these online document definition links are utilized in online document footnotes. In the following description, for the purposes of explanation, numerous specific details are set forth in order to provide a thorough understanding of the present invention.

In one embodiment, an online document generation tool converts documents to XHTML. XHTML documents are XML conforming. By being XML-conforming, documents are readily viewed, edited, and validated with standard XML tools. Additionally, XHTML documents can be written to operate in existing HTML-conforming user agents as well as in new XHTML-conforming user agents. XHTML documents can also utilize applications, for example scripts and applets, that rely upon either the HTML Document Object Model or the XML Document Object Model [DOM]. Furthermore, documents conforming to XHTML 1.0 will be more likely to interoperate within and among various XHTML environments.

Definition Links in Online Documents

In one embodiment, a call to a JavaScript subroutine is placed at the link definition. In one embodiment, the JavaScript subroutine generates a popup window, and shifts the focus from the window where the definition link resides into a generated popup window, which contains a corresponding link definition. The screen reader reads the link definition information within the window and conveys to the user that there is an OK button. In response to activation of an affirmative selection, such as an OK button, the popup link definition window is removed and the user is placed back at the current position in the text (with the HREF) where the definition link resides.

User Interaction with the Online Definition Link Utility

FIG. 1 is a high-level block diagram of an embodiment illustrating an example of the various components in an online definition link utility. FIG. 2 is a high-level block diagram of an embodiment illustrating a flow chart of the process of user interaction with the online definition link utility.

At block 201, the initial step in the process of a user or screen reader reading an online document 101 containing a definition link 102 is detailed. Generally the user selects a definition link in an online document to read a definition text associated with the link.

At block 202, once the user has selected the definition link 102, a JavaScript routine is invoked, and at block 203, a popup link definition window 103, which contains a corresponding link definition text 106 is generated. Similarly, once the user has selected definition link 104, a JavaScript routine is invoked and a popup link definition window 105, which contains a corresponding definition text, is generated.

At block 204, the user or screen reader reads link definition text 106 contained in the popup window 103.

At block 205, after reading of the link definition text 106 is completed, the user closes the popup window 103.

At block 206, the user is brought back to the area in the online document 101 where the originating definition link 102 resides.

Footnote Definition Links in Online Documents

In one embodiment, the definition links are exemplified as footnote definition links and the link definitions are exemplified as footnote link definitions.

Support for Providing Text Emphasis, Email and URL Support

Figure 3:
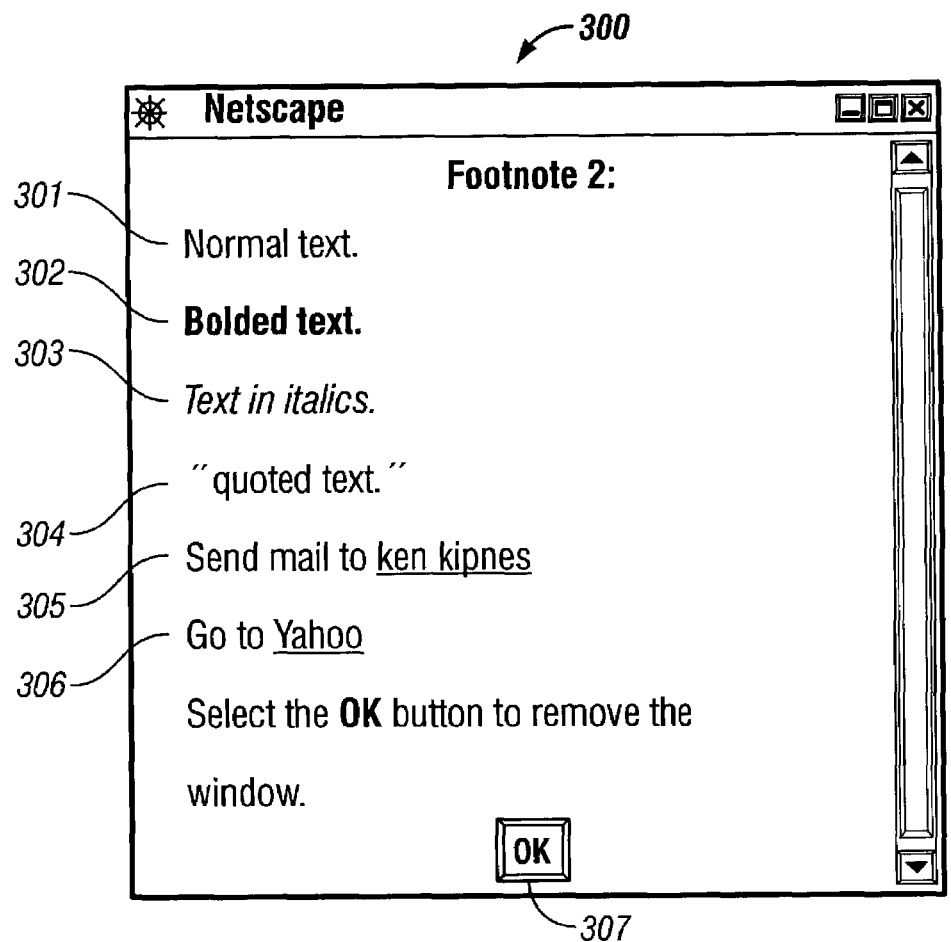
FIG. 3 is a block diagram of an embodiment illustrating an example of a hypertext online popup window generated by a JavaScript subroutine for an online definition link utility.

FIG. 3 represents an embodiment illustrating an example of the JavaScript link definition popup window generated by the example subroutine 500 of FIGS. 5A and 5B for an online definition link utility. FIG. 3 is an example of the link definition popup window 300 that is generated by the example subroutine 500 in FIGS. 5A and 5B. Use of the example subroutine 500 accommodates complex support for text emphasis, email and URL support within the definition link popup window which may include text strings 301, emphasis of text; for example bolding 302, italicizing 303, quoted text 304, hypertext references to other URL locations 306 and mailto links to email addresses 305. In one embodiment, a JavaScript function 500 is associated with the footnote number 300 and footnote string passed into the function <A href="#1003086" onclick='footdisplay(2,"<P>Normal text.<br><b>Bolded</b> text.<Text in <i>Text in italics</i>.<br>\"quoted text\"<br>Send mail to<a href=mailto:ken.kipnes@somemailaddress.mail>ken kipnes</a><br> Select the <b> OK </b> button to remove the window. </p>")'.</a> The onclick function call will again create the popup window, and shift focus to the footnote window, when the link is activated. After selecting the OK button 307, the popup window will close, shifting focus back to the originating window and the HREF URL will bring the user back to the current position with an HTML NAME argument. The footnote will have text emphasis 302-304, URL 306 and email-enabled 305 JavaScript in the popup window 300.

FIGS. 5A and 5B illustrate an example of the JavaScript subroutine for an online definition link utility. In one embodiment a JavaScript subroutine 500 is associated with a footnote link definition in a hypertext online document. Line 4 of subroutine 500 when executed creates a popup window 502, that shifts the focus from the online document with the definition link to the popup window 502, which contains the link definition 504. A screen reader then reads the footnote definition text in the popup window 502. Once the reader has completed reading the footnote definition text the user is prompted to close the popup window 506. After the popup window is closed 508, the popup window is removed and the user is placed back at the original position in the online document, 510, (with the HREF, 511) where the footnote link resides 512. In one embodiment, a JavaScript function 500 is associated with the footnote number 513 and footnote string 509 that is passed into the function (<A href="#1003086" onclick="footdisplay(2, foot2) . . . ), where the footnote string 509 is:

"<P>Normal text.<br><b>Bolded text</b> <br><i>Text in italics. </i>. <br>\"quoted text\"<br> Send mail to<a href=mailto:ken.kipnes@somemailaddress.mail>ken kipnes</a><br> Select the <b> OK </b> button to remove the window.</p>".

The onclick function call will a link definition popup window 502, and shift focus to the footnote link definition 504, when the definition link is activated. After selecting the OK button 508, the HREF URL will bring the user back to the current position with an HTML NAME argument 510. The footnote will have text emphasis as described in FIG. 3, 302-304, URL 306 and email-enabled 305 JavaScript in the generated popup window 300 generated by JavaScript subroutine 500.

In one embodiment, the original footnote list at the end of the chapter or table will remain at the end of the chapter, so as to facilitate printing.

Difference in Behavior Between Traditional Footnote Definition Links and an Example of an Embodiment of the Footnote Definition Link Method of the Present Invention FIGS. 6A-10B provide an example HTML page that illustrates the difference in behavior between traditional footnote definition links and an example of an embodiment of the footnote definition link method of the present invention. Note that there are several unrelated footnotes added to the example footnote list at the end of the example online document to provide a real-world effect for an example of traditional footnotes definition links in online documentation.

For purposes of explanation, the example online document FIGS. 6A-10B, include footnotes in the text flow which represent the behavior of traditional definition links and their associated link definitions in online documentation. FIGS. 6A-10B illustrate the behavior of example embodiments of definition links and their associated link definitions of the present invention. In both the examples of the traditional and the example embodiments of the present invention, these footnotes are generally followed by cross-references to those footnotes. "Foot" or "Footref" and a reference number in superscript text identify footnotes. A footref refers to a footnote that has appeared at least once before in the chapter.

Traditional Footnote Placement

Figure 6A:
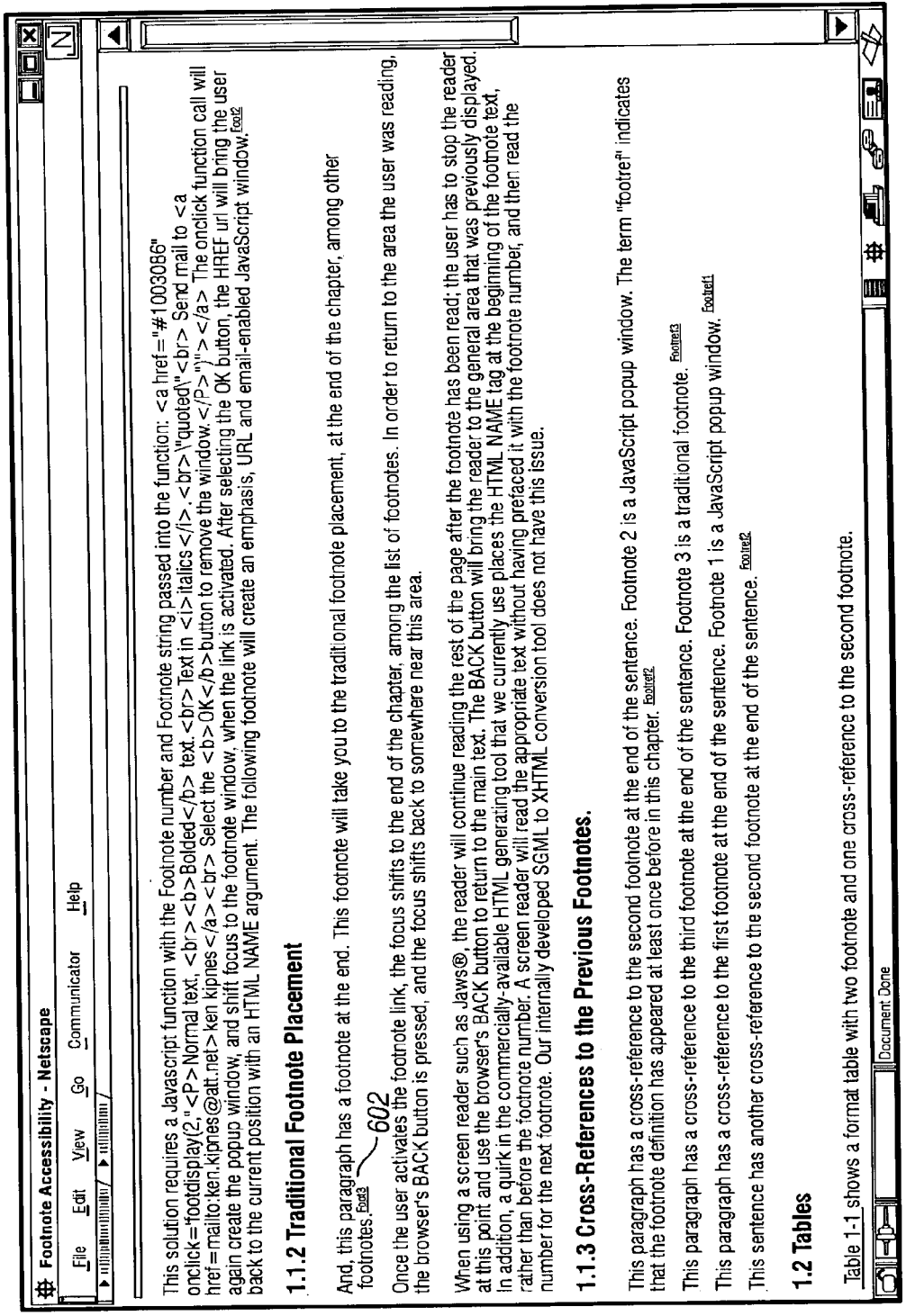

FIG. 6A illustrates an example of a conventional footnote definition link 602 and associated footnote link definition area 604. An example of traditional footnote link definition area 604 in a traditional online document is listed at the end of the page, in a numerical order. In the exemplary online document, the paragraph has a footnote 602$^{(Foot3)}$ at the end of the paragraph. Once the user activates the footnote link 602, the focus shifts to the end of the chapter, among the list of footnotes 604. In order to return to the area the user was reading, the browser's BACK button 606 is selected (FIG. 6B), and the focus shifts back to somewhere near the original online document area.

Figure 7A:
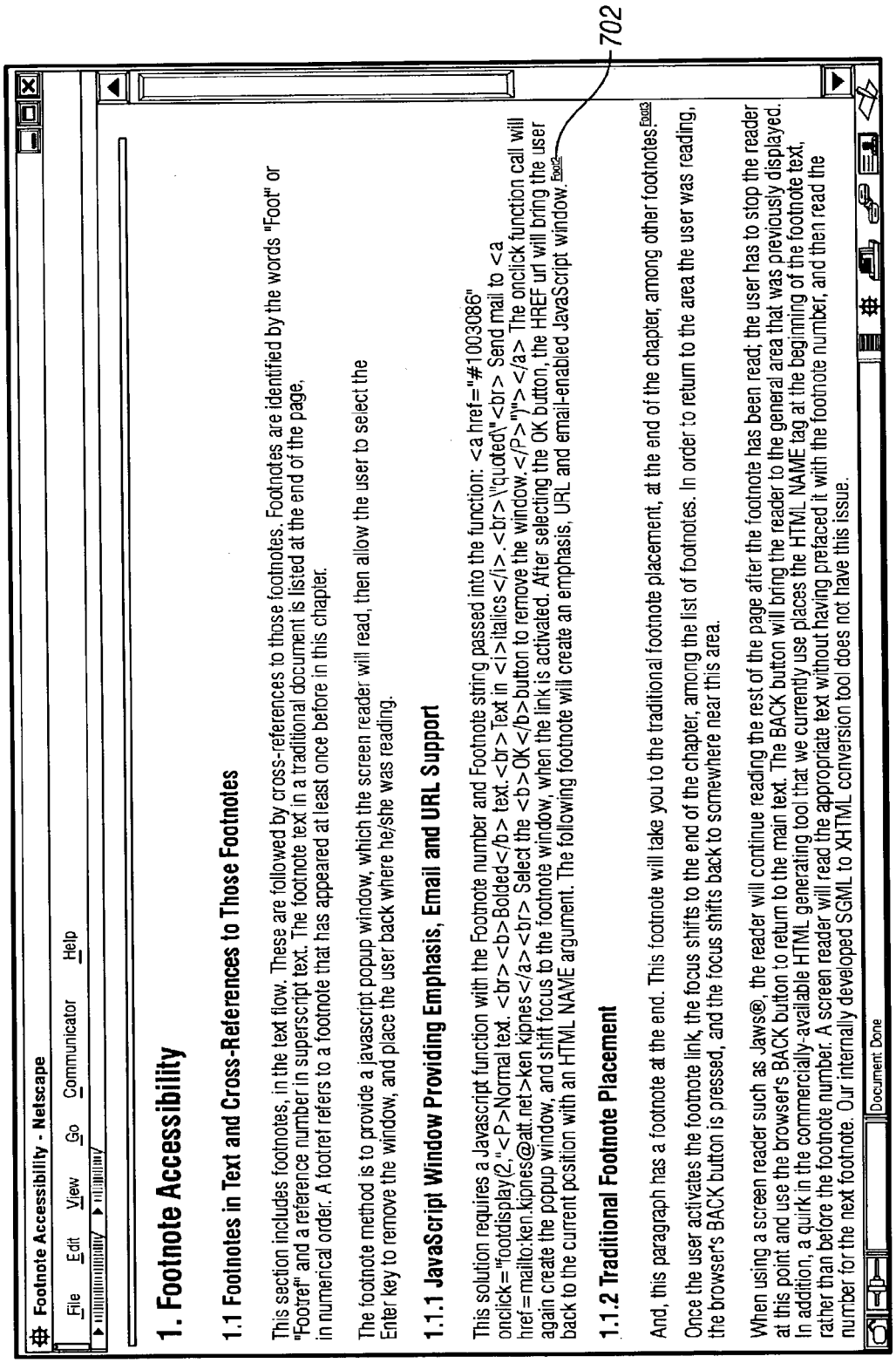
Figure 7B:
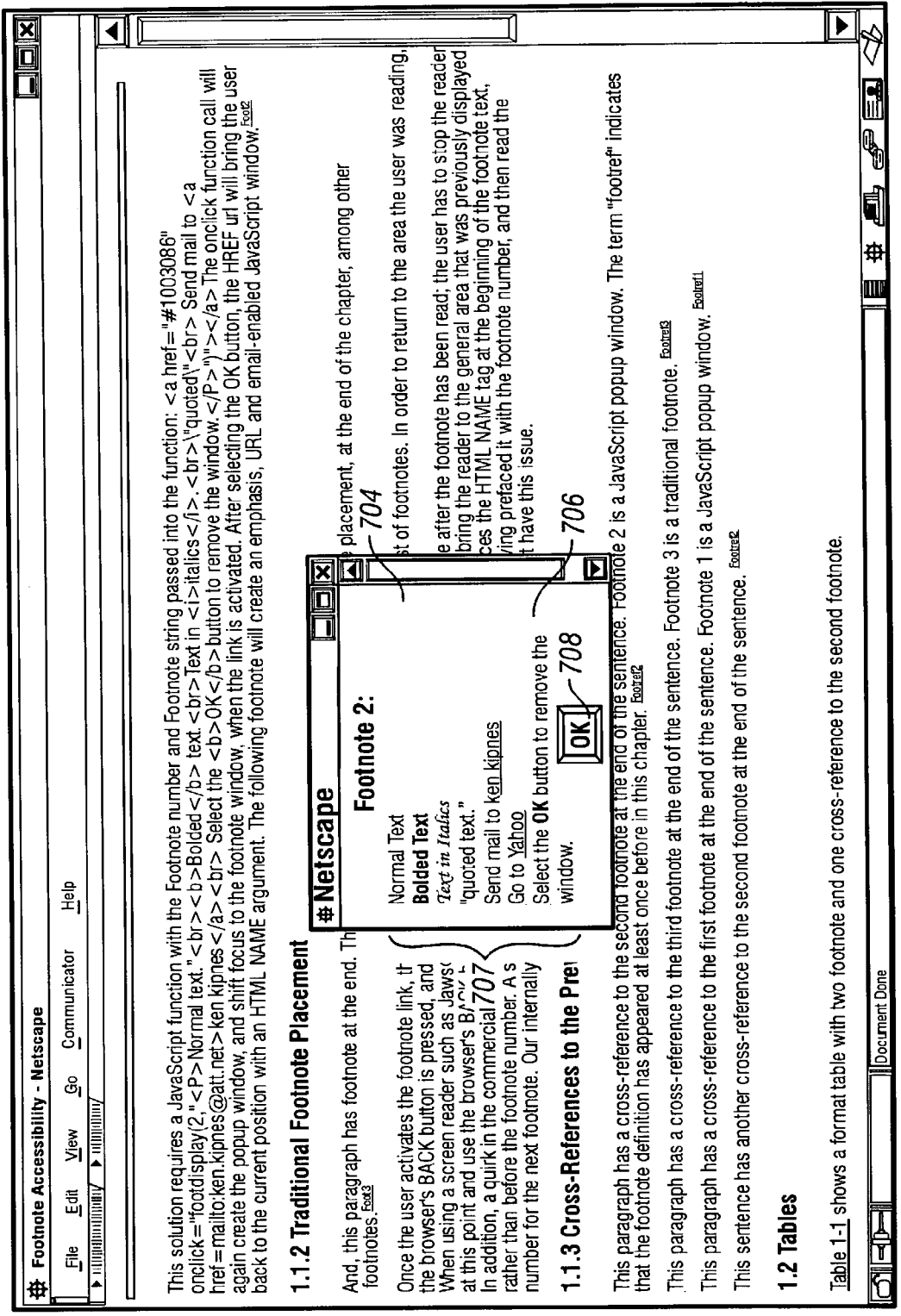

In one embodiment, an example of the footnote method of the present invention is provided. In FIG. 7A, a footnote definition link 702 is activated which invokes a JavaScript subroutine which generates a JavaScript popup window 704 (FIG. 7B) the screen reader will read through the contents 707 of the JavaScript popup window 704 and prompt 706 the user to close the JavaScript popup window 704 by activating an OK button 708. The user will then be placed back in the online document where the footnote definition link 702 resides.

Cross-References to Previous Footnotes

Figure 8A:
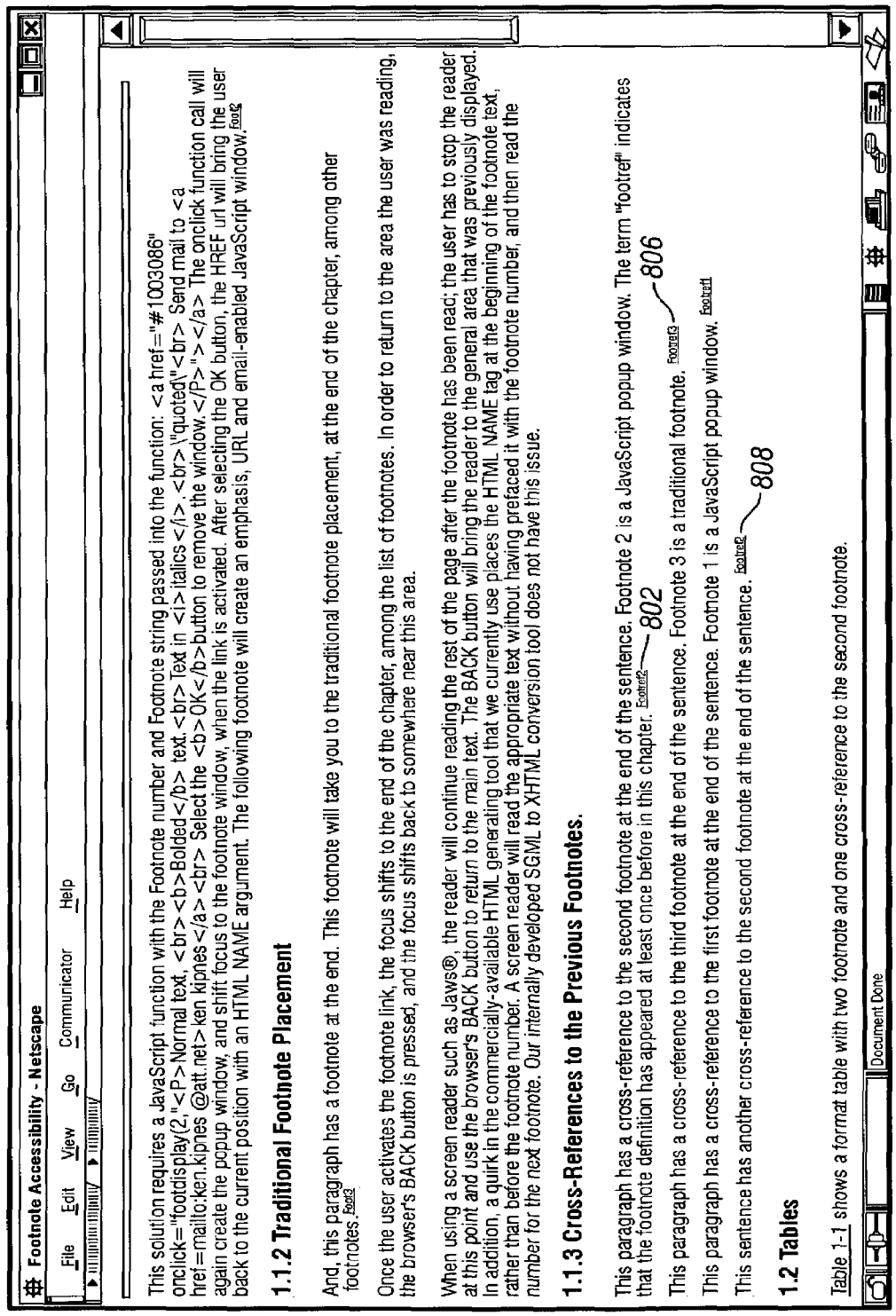
Figure 8B:
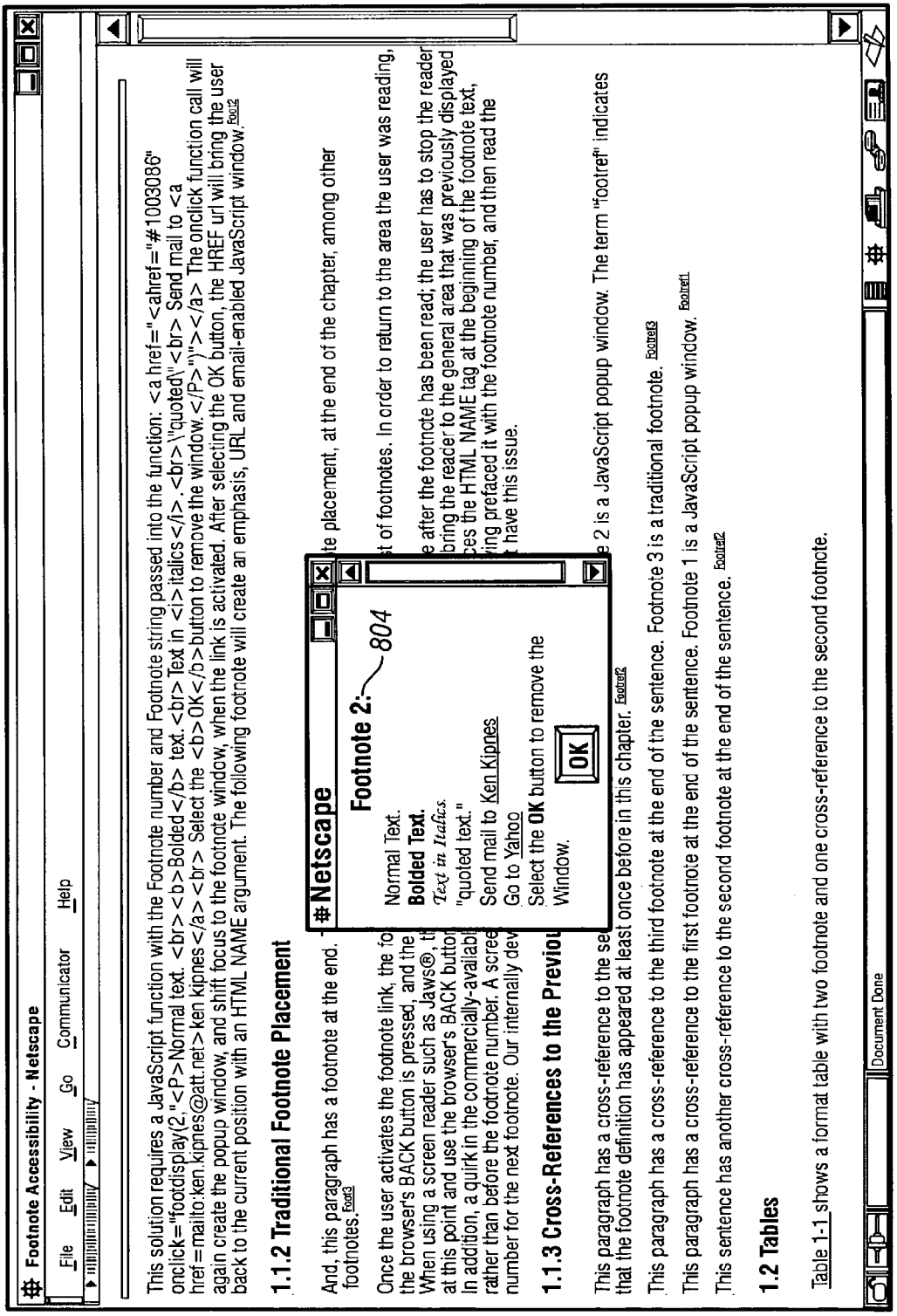
Figure 9A:
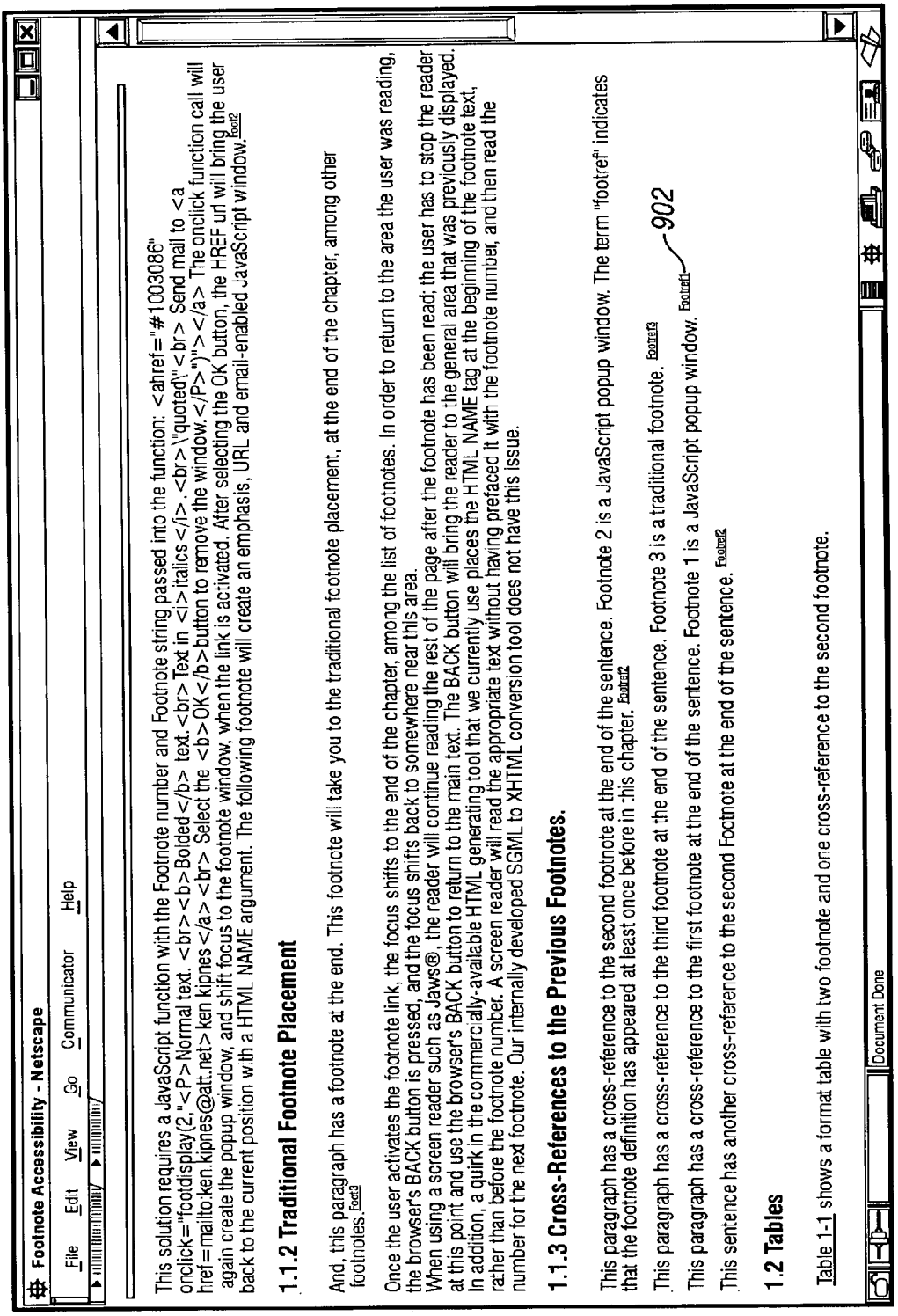
Figure 9B:
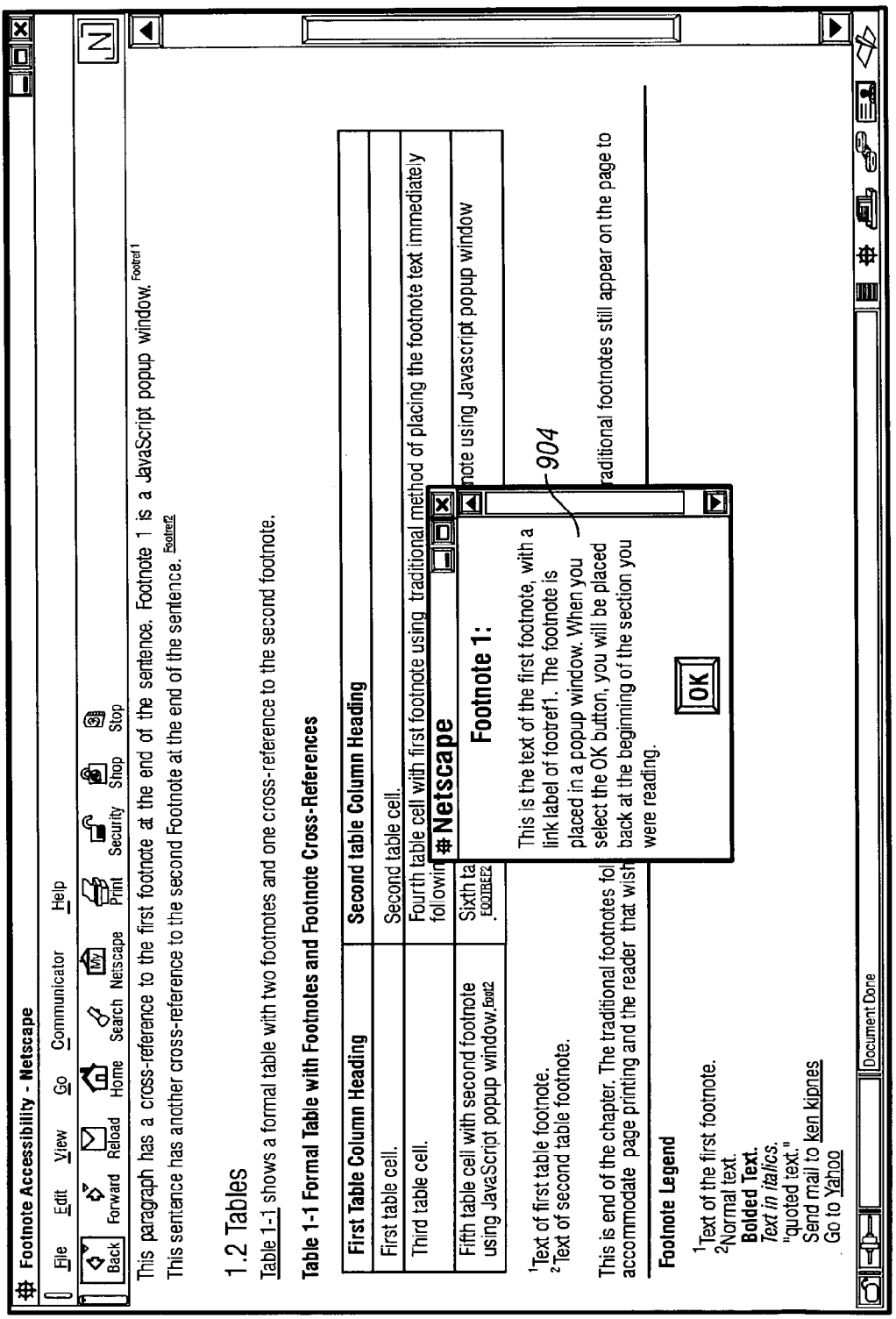

According to one aspect of the invention, support for cross-references to previous footnotes is provided. FIGS. 8A and 8B provide an example of an online document that contains a cross-reference to a second footnote definition link at the end of the sentence $^{Footref2}$802. The term "footref" indicates that the footnote definition has appeared at least once before in the chapter of the online document. Footnote 2 link definition area 804 is a JavaScript popup window. In FIG. 9A, $^{Footref1}$ 902 illustrates an example of a paragraph has a cross-reference to the first footnote at the end of the sentence. A JavaScript popup window Footnote 1 904 is generated in response to activation of footnote definition link 902. $^{Footref2}$808 illustrates an example of a sentence that contains another cross-reference to the second footnote at the end of the sentence.

Tables with Footnotes and Footnote Cross-References

In one embodiment, according to one aspect of the invention, support for tables with footnotes and footnote cross-references is provided.

Table 1-1 shows a formal table with two footnotes and one cross-reference to the second footnote.

TABLE 1-1

Formal Table with Footnotes and Footnote Cross-References Section

| First Table Column Heading | Second Table Column Heading |
|---|---|
| First table cell. | Second table cell. |
| Third table cell. | Fourth table cell with first footnote using traditional method of placing the footnote text immediately following the table.$^{Foot1}$ |
| Fifth table cell with second footnote using JavaScript popup window.$^{Foot2}$ | Sixth table cell with a cross-reference to the second footnote using JavaScript popup window.$^{Footref2}$ |

$^{1}$Text of first table footnote.
$^{2}$Text of second table footnote.

This is the end of the chapter. The text footnotes follow the chapter at the end of the web page. The text footnotes still appear on the page to accommodate page printing and the reader that wishes to use the traditional method.

Footnote Legend
$^{1}$Text of the first footnote.
$^{2}$Normal text.
Bolded text.
Text in italics.
"quoted text."
Send mail to ken kipnes
Go to Yahoo
$^{3}$Third footnote among many.
$^{4}$The screen reader will continue reading through the remaining footnotes on the page.
$^{5}$This can cause confusion as the remaining footnotes are out of context with what the user has been reading.
$^{6}$Using the browser's BACK button will bring the user back to the area where the footnote was found, but may not be on the exact line of text.

Figure 10A:
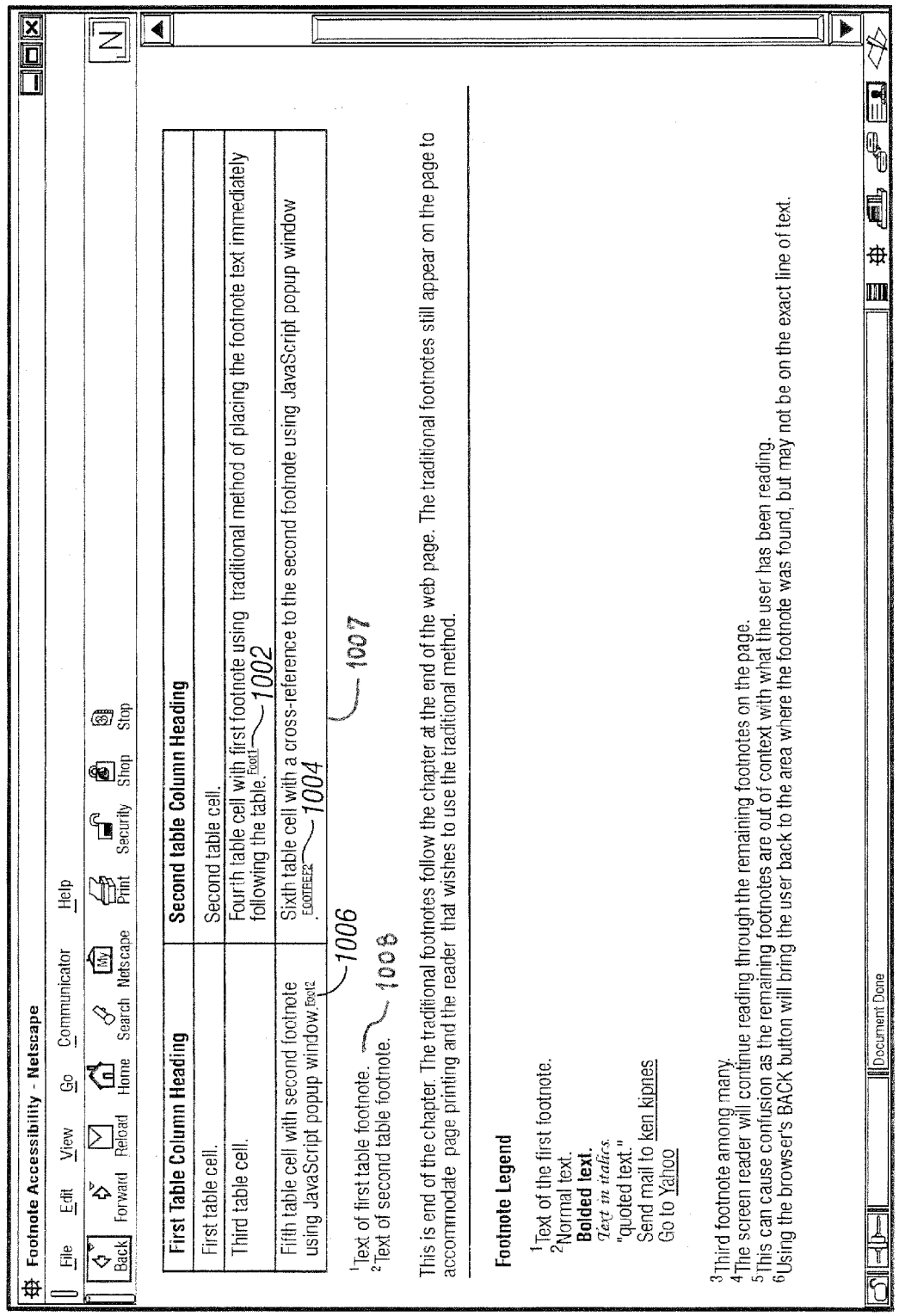
Figure 10B:
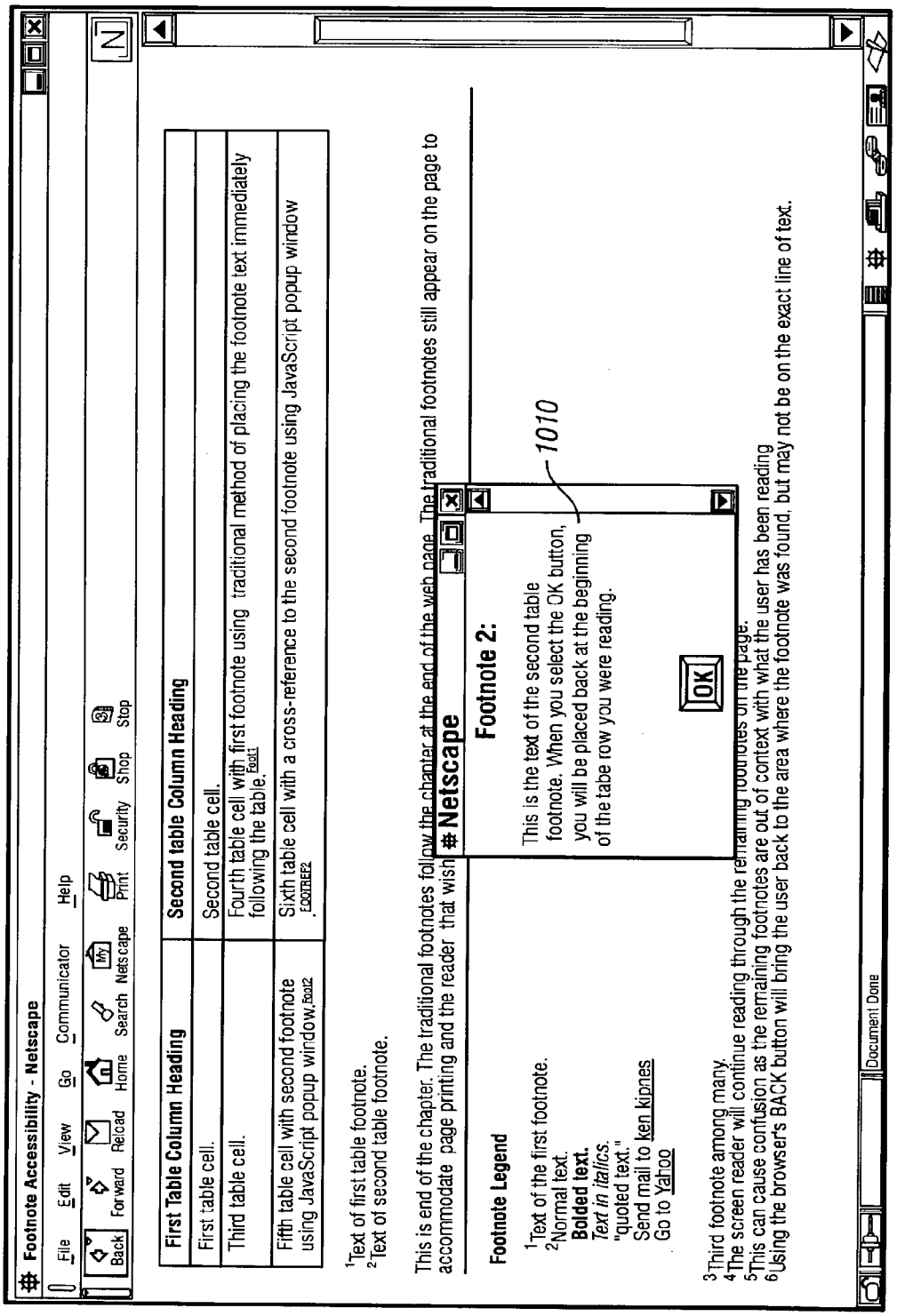

According to one aspect of the invention, FIGS. 10A and 10B illustrate an example of an embodiment whereby support for tables with footnotes and footnote cross-references is provided. Fourth table cell with first footnote $^{Foot1}$1002 exemplifies a traditional method of placing footnote link definition text 1008 immediately following the table 1007. The sixth table cell exemplifies a cross-reference to the second footnote $^{Footref2}$1004 invocation of JavaScript popup window 1010. The fifth table cell with second footnote $^{Foot2}$1006 exemplifies invocation of another JavaScript popup window (not shown).

Hardware Overview

The approach for definition links in online documentation described herein may be implemented in a variety of ways and the invention is not limited to any particular implementation. The approach may be integrated into an online documentation system, in a browser, or may be implemented as a stand-alone mechanism. Furthermore, the approach may be implemented in computer software, hardware, or a combination thereof.

Figure 4:
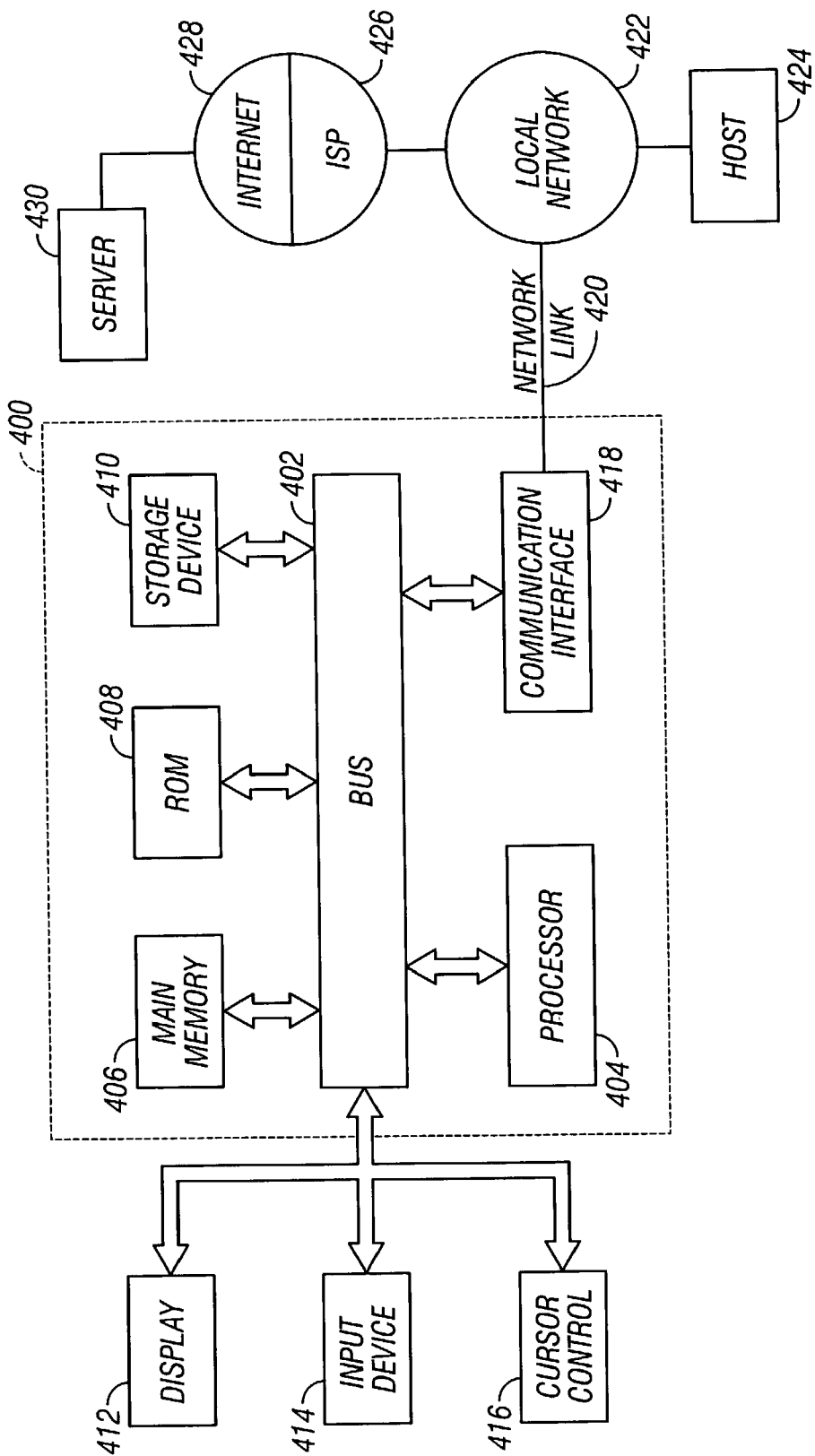
FIG. 4 is a of a computer system hardware arrangement that can be used to implement aspects of the invention.

FIG. 4 is a block diagram that illustrates a computer system 400 upon which an embodiment of the invention may be implemented. Computer system 400 includes a bus 402 or other communication mechanism for communicating information, and a processor 404 coupled with bus 402 for processing information. Computer system 400 also includes memory 406, such as Random Access Memory (RAM) or other dynamic storage device, coupled to bus 402 for storing information and instructions to be executed by processor 404. Computer system 400 further includes a read only memory (ROM) 408 or other static storage device coupled to bus 402 for storing static information and instructions for processor 404. A storage device 410, such as a magnetic disk or optical disk, is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a track ball, or cursor direction keys for communicating direction information and command selections to processor 404 and for controlling cursor movement on display 412. This input device typically has two degrees of freedom into axes, the first axes (for example, x) and a second axis (for example, y), that allows the device to specify positions in a plane.

The invention is related to be used a computer system 400 for links in online documentation. According to one embodiment of the invention, accessing definition links in online documentation is carried out by computer system 400 in response to processor 404 executing one or more sequences of one or more instructions contained in main memory 406. Such instructions may be read into main memory 406 from another computer readable medium, such a storage device 410. Execution of the sequences of instructions contained in main memory 406 causes processor 404 to perform the process steps described herein. In alternative embodiments, hardware circuitry may be used in place of or in combination with software instructions to implement the invention. Thus, embodiments of the invention are not limited to any specific combination of hardware circuitry and software.

The term "computer readable medium" as used herein refers to any medium that participates in providing instructions to processor 404 for execution. Such a medium may take many forms, including but not limited to, non-volatile media, volatile media, and transmission media. Non-volatile media includes, for example, optical or magnetic disks, such a storage device 410. Volatile media includes dynamic memory, such as main memory 406. Transition media includes coaxial cables, copper wire and fiber optics, including the wires to comprise bus 402. Transition media can also to the form of acoustic or light waves, such as those generated during radio wave and infrared data communications.

Common forms a computer readable media includes, for example, a floppy disk, a flexible disk, a hard disk, magnetic tape, or any other magnetic medium, a CD ROM, any other optical medium, punch cards, paper tape, any other physical medium with patterns of holes, a RAM, a PROM, an EROM, a FLASH-EPROM, and any other memory chip or cartridge, a carrier wave as described herein after, or any other medium from which a computer can read.

Various forms of computer readable media may be involved in caring one or more sequences of one or more instructions to processor 404 for execution. For example, the instructions may initially be carried out on a magnetic disk of a remote computer. The remote computer can load the instructions into its dynamic memory and send instructions over a telephone line using a modem. In the local to computer system 400 can receive the data on the telephone line and use and infrared transmitter to convert the data to an infrared signal. An infrared detector can receive the data carried in the infrared signal an appropriate circuitry completes the data on bus 402. Bus 402 carries the data to main memory 406, from which processor 404 retrieves and executes the instructions. The instructions received by main memory 406 may optionally be stored in storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card or a modem to provide a data communication connection to a corresponding type of telephone line. As another example, communication interface 418 may be a local area network (LAN) card to provide a data communication connected to compatible local area network. Wireless links may also be implemented. In any such implementation, communication interface 418 sends and receives electrical, electromagnetic or optical signal to carry digital streams representing various types of information.

Network link 420 typically provides data communication to one or more network static data devices. For example, network link 420 may provide a connection to local network 422 to host computer 424 or to data equipment operated by an Internet service provider (ISP) 426. ISP 426 in turn provides data communication services for the worldwide packet data communication network now commonly referred to as the "Internet" 428. Local area network 422 an Internet 428 both use electrical, electromagnetic or optical signal to carry digital data streams. The signal to the various networks in the signals a network link 420 into the communication interface 418, which carry digital data to and from computer system 400 are exemplary forms of carrier waves transporting information.

Computer system 400 can send messages and receive data, including program code, through the network, the network link 420 and the communication interface 418. In the Internet example, a server 430 might transmit the request code for an application programs are Internet 428, ISP 426, local network 422 and communication interface 418. In accordance with the invention, one such downloaded application provides for definition links in online documentation in a network as described herein.

The received code may be executed by processor 404 as it is received, and/or stored in storage device 410, or other non-volatile storage for later execution. In this manner, computer system 400 may obtain application code in the form of the carrier wave.

Alternatives, Extensions

Software and hardware vendors are currently studying how to best respond to Federal Section 508 requirements, and would likely view a utility as described previously assistive towards that end. This solution removes the confusion of reading multiple definitions in a definition area each time the user selects a definition link, and brings the user back the specific area where the definition link resides.

In the foregoing specification, the invention has been described with reference to specific embodiments thereof. It will, however be evident that various modifications and changes can be made thereto without departing from the broader spirit and scope of the invention. For example, the reader is to understand that the specific ordering and combination of modules and processes described herein are merely illustrative and, unless specifically indicated otherwise the invention can be performed using different or additional modules or process functions, or a different combination or ordering of modules and process functions. The specification and drawings are, accordingly, to be regarded in an illustrative rather than restrictive sense.

In addition, in this disclosure, certain process steps are set forth in a particular order, and alphabetic and alphanumeric labels are used to identify certain steps. Unless specifically stated in the disclosure, embodiments of the invention are not limited to any particular order of carrying out such steps. In particular, the labels are used merely for convenient identification of steps, and are not intended to imply, specify or require a particular order of carrying out such steps. Furthermore, other embodiments may use more or fewer steps than those discussed herein.

What is claimed is:

1. A method comprising performing a machine-executed operation involving instructions, wherein the machine-executed operation is at least one of:

A) sending the instructions over transmission media;
B) receiving the instructions over transmission media;
C) storing the instructions onto a machine-readable storage medium; and
D) executing the instructions;
wherein the instructions, when executed by one or more processors, cause the one or more processors to perform the steps of:
  while a screen reader is reading to a user an online document containing a link, determining when the screen reader has arrived at a first portion of the online document that contains the link;
  in response to determining that the screen reader has arrived at the first portion of the online document that contains the link, providing a mechanism to the user by which the user can select to have a definition text, associated with the link, immediately read to the user;
  wherein the link identifies a footnote, wherein the footnote has the definition text that is a second portion of content of the online document and that is located within the online document at a location that is not proximate to the link, and wherein the definition text is a text of the footnote;
  receiving, through the mechanism, first input which indicates that the user has selected to have the definition text that is associated with the link immediately read to the user;
  in response to the first input, performing the steps of:
    activating the link; and
    in response to activating the link, invoking a programmatic routine, wherein the programmatic routine, when invoked, causes the one or more processors to perform:
      generating a pop-up window, wherein the pop-up window includes the definition text and a user prompt, wherein generating the pop-up window includes copying into the pop-up window said second portion of the content of the online document;
      automatically shifting focus away from the first portion of the online document that contains the link to allow the screen reader to read to the user the definition text associated with the link, wherein shifting focus away from the first portion comprises shifting focus to the pop-up window;
      the screen reader reading, from the pop-up window, the definition text to the user; and
    after the screen reader finishes reading the definition text associated with the link, performing the steps of:
      receiving second input from the user, wherein the second input selects the user prompt;
      in response to receiving the second input, closing the pop-up window;
      shifting the focus back to the online document that contains the link to allow the screen reader to continue to read at a position in the online document that is proximate to the link; and
      the screen reader continuing to read at the position in the online document that is proximate to the link.

2. The method of claim 1, wherein the step of the screen reader continuing to read at the position in the online document that is proximate to the link comprises the screen reader continuing to read at the beginning of a paragraph, of the online document, that contains the link.

3. The method of claim 1, wherein the step of the screen reader continuing to read at the position in the online document that is proximate to the link comprises the screen reader continuing to read at a point in the online document that immediately follows the link.

4. The method of claim 1, wherein:
the link includes code for making a call to invoke the programmatic routine; and
the instructions further comprise instructions which, when executed by the one or more processors, cause the one or more processors to perform the step of executing the call to invoke the programmatic routine.

5. The method of claim 1, wherein the step of the screen reader reading the definition text to the user further comprises the screen reader reading, from the pop-up window, the user prompt to the user.

6. The method of claim 1, wherein:
the programmatic routine is a JavaScript routine; and
the user prompt is a button for closing the pop-up window, wherein the button is one of an OK button and a CLOSE button.

7. The method of claim 1, wherein
the second portion of the content of the online document includes the definition text, wherein the second portion is different than the first portion.

8. The method of claim 1, wherein the link is an HTML HREF link.

* * * * *

UNITED STATES PATENT AND TRADEMARK OFFICE
CERTIFICATE OF CORRECTION

PATENT NO. : 7,493,560 B1  Page 1 of 1
APPLICATION NO. : 10/278330
DATED : February 17, 2009
INVENTOR(S) : Kipnes et al.

It is certified that error appears in the above-identified patent and that said Letters Patent is hereby corrected as shown below:

In column 6, line 35, delete "argument 510." and insert -- argument. --, therefor.

Signed and Sealed this

Eleventh Day of May, 2010

David J. Kappos
*Director of the United States Patent and Trademark Office*